(12) United States Patent
Matsuoka

(10) Patent No.: US 10,267,031 B2
(45) Date of Patent: Apr. 23, 2019

(54) VARIABLE SHAPE FRAME AND VARIABLE SHAPE THREE-DIMENSIONAL STRUCTURE

(71) Applicant: FUJIMIYASEISAKUSHO CO., LTD., Kumamoto (JP)

(72) Inventor: Norimichi Matsuoka, Kumamoto (JP)

(73) Assignee: FUJIMIYASEISAKUSHO CO., LTD., Kumamoto (JP)

( * ) Notice: Subject to any disclaimer, the term of this patent is extended or adjusted under 35 U.S.C. 154(b) by 0 days.

(21) Appl. No.: 15/809,287

(22) Filed: Nov. 10, 2017

(65) Prior Publication Data

US 2018/0155922 A1 Jun. 7, 2018

(30) Foreign Application Priority Data

Dec. 6, 2016 (JP) ................................. 2016-236550

(51) Int. Cl.
*E04H 12/18* (2006.01)
*E04B 1/343* (2006.01)
(Continued)

(52) U.S. Cl.
CPC ......... *E04B 1/34357* (2013.01); *A63H 33/00* (2013.01); *E04B 1/19* (2013.01); *E04C 3/02* (2013.01); *E04H 15/50* (2013.01)

(58) Field of Classification Search
CPC ...... E04B 1/19; E04B 1/3441; E04B 1/34357; E04C 3/02; E04H 15/50; E04H 15/52
(Continued)

(56) References Cited

U.S. PATENT DOCUMENTS 250,205 A * 11/1881 Collins .................... B65D 7/26
220/6
1,712,836 A 5/1929 Mills
(Continued)

FOREIGN PATENT DOCUMENTS

DE 376 365 5/1923
EP 3 088 065 11/2016
(Continued)

OTHER PUBLICATIONS

Partial EP Search Report dated Apr. 5, 2018 from corresponding application No. EP 17197270.6.

*Primary Examiner* — Joshua J Michener
*Assistant Examiner* — James J Buckle, Jr.
(74) *Attorney, Agent, or Firm* — Hauptman Ham, LLP

(57) ABSTRACT

A variable shape frame having a polygonal shape includes: extendable arms forming each side of a polygonal frame; and corner members located at at least two of the corners of the polygon. Each of the extendable arms includes cross units each formed by two rigid members in an X-shape and pivotally coupled by a middle coupling shaft, and an end coupling portion pivotally coupling ends of adjacent ones of the cross units. The end coupling portion includes inner end coupling shafts and outer end coupling shafts. Adjacent two of the extendable arms are pivotally coupled by a common one of the inner end coupling shafts at every corner of the polygon. The corner member includes a first guide portion linearly guiding the inner end coupling shafts of the first extendable arm, and a second guide portion linearly guiding the inner end coupling shafts of the second extendable arm.

12 Claims, 20 Drawing Sheets

(51) Int. Cl.
*E04C 3/02* (2006.01)
*E04B 1/19* (2006.01)
*A63H 33/00* (2006.01)
*E04H 15/50* (2006.01)

(58) Field of Classification Search
USPC .......................................... 52/109, 645, 646
See application file for complete search history.

(56) References Cited

U.S. PATENT DOCUMENTS

| | | | | |
|---|---|---|---|---|
| 2,697,845 | A * | 12/1954 | Broner | E01D 15/124 |
| | | | | 14/45 |
| 3,053,351 | A * | 9/1962 | Fulcher | B66F 3/22 |
| | | | | 182/157 |
| 3,496,687 | A * | 2/1970 | Greenberg | B64G 9/00 |
| | | | | 294/86.4 |
| 4,013,114 | A | 3/1977 | Goebel | |
| 4,126,974 | A * | 11/1978 | Hardin | E04H 12/185 |
| | | | | 182/141 |
| 5,038,532 | A * | 8/1991 | Shahinpoor | E04B 1/3441 |
| | | | | 52/109 |
| 5,167,100 | A * | 12/1992 | Krishnapillai | B64G 9/00 |
| | | | | 135/145 |
| 5,761,871 | A * | 6/1998 | Atake | E04B 1/32 |
| | | | | 52/109 |
| 7,604,212 | B2 * | 10/2009 | Tsai | E04H 15/50 |
| | | | | 119/474 |
| 9,334,643 | B2 * | 5/2016 | Betts | A01K 1/00 |
| 9,518,403 | B1 * | 12/2016 | Tucker | E04H 15/58 |
| 9,840,837 | B1 * | 12/2017 | Matsuoka | E04B 1/19 |
| 10,006,194 | B2 * | 6/2018 | Matsuoka | E04B 1/32 |
| 10,006,195 | B2 * | 6/2018 | Matsuoka | A63H 33/00 |
| 2002/0083675 | A1 * | 7/2002 | Hoberman | A63F 9/088 |
| | | | | 52/645 |
| 2004/0144413 | A1 * | 7/2004 | Matthews | E04H 15/50 |
| | | | | 135/131 |
| 2006/0101731 | A1 * | 5/2006 | Hanson | B60P 1/435 |
| | | | | 52/109 |
| 2009/0249546 | A1 * | 10/2009 | Yul | A47C 17/72 |
| | | | | 5/115 |
| 2015/0060605 | A1 * | 3/2015 | Tserodze | H01Q 15/161 |
| | | | | 244/172.6 |
| 2015/0300560 | A1 * | 10/2015 | Matsuoka | B25J 18/02 |
| | | | | 362/427 |

FOREIGN PATENT DOCUMENTS

| | | |
|---|---|---|
| JP | 2014159070 A | 9/2014 |
| JP | 2016211617 | 12/2016 |

* cited by examiner

US 10,267,031 B2

VARIABLE SHAPE FRAME AND VARIABLE SHAPE THREE-DIMENSIONAL STRUCTURE

BACKGROUND OF THE INVENTION

Field of the Invention

The present invention relates to variable shape frames and variable shape three-dimensional structures whose shape can be changed according to an extending/contracting operation of extendable arms.

Background Art

The applicant of the present application proposed in Japanese Unexamined Patent Application Publication No. 2014-159070 an extendable arm that extends and contracts in a curved path. This extendable arm is formed by a plurality of cross units connected in a linear fashion, and each cross unit is formed by two rigid members crossing each other in an X-shape.

SUMMARY OF INVENTION

The inventors of the present application considered more effective use of such an extendable arm and found that a two-dimensional shape and a three-dimensional shape can be changed by using the extendable arm.

It is an object of the present invention to provide a variable shape frame and a variable shape three-dimensional structure whose shape can be changed according to an extending/contracting operation of an extendable arm.

The invention according to one aspect is a variable shape frame which has a polygonal shape and whose shape can be changed. The variable shape frame includes: extendable arms forming each side of the polygonal frame; and corner members located at at least two of all corners of the polygon.

Each of the extendable arms includes a plurality of cross units each formed by two rigid members crossing each other in an X-shape and pivotally coupled by a middle coupling shaft, and an end coupling portion pivotally coupling ends of adjacent ones of the cross units. The end coupling portion includes inner end coupling shafts located on an inner side of the polygonal frame and outer end coupling shafts located on an outer side of the polygonal frame. Adjacent two of the extendable arms are pivotally coupled by a common one of the inner end coupling shafts at every corner of the polygon.

The corner member located between the first extendable arm and the second extendable arm which are adjacent to each other includes a first guide portion and a second guide portion. The first guide portion linearly guides two or more of the inner end coupling shafts, two or more of the middle coupling shafts, or two or more of the outer end coupling shafts of the first extendable arm in a longitudinal direction of the side formed by the first extendable arm. The second guide portion linearly guides two or more of the inner end coupling shafts, two or more of the middle coupling shafts, or two or more of the outer end coupling shafts of the second extendable arm in a longitudinal direction of the side formed by the second extendable arm.

In a preferred embodiment, the corner member includes the common inner end coupling shaft that pivotally couples the first extendable arm and the second extendable arm, the first guide portion, and the second guide portion.

Preferably, the first guide portion linearly guides the two or more of the inner end coupling shafts of the first extendable arm in the longitudinal direction of the side formed by the first extendable arm, and the second guide portion linearly guides the two or more of the inner end coupling shafts of the second extendable arm in the longitudinal direction of the side formed by the second extendable arm.

In a preferred embodiment, the corner member includes a first straight member extending in the longitudinal direction of the side formed by the first extendable arm and a second straight member extending in the longitudinal direction of the side formed by the second extendable arm. The first guide portion is a slit extending from a distal end toward a proximal end of the first straight member, and the second guide portion is a slit extending from a distal end toward a proximal end of the second straight member.

In one embodiment, the polygon is a quadrilateral, and the corner members are located at two opposite ones of the corners. In another embodiment, the corner members are located at every corner of the polygon.

The invention according to another aspect is a variable shape frame which has a polygonal shape and whose area can be changed. The variable shape frame includes: extendable arms forming each side of the polygonal frame; and a variable length coupling member whose length can be changed and which couples two of the extendable arms which form at least two opposite ones of the sides of the polygonal frame.

Each of the extendable arms includes a plurality of cross units each formed by two rigid members crossing each other in an X-shape and pivotally coupled by a middle coupling shaft, and an end coupling portion pivotally coupling ends of adjacent ones of the cross units. The end coupling portion includes inner end coupling shafts located on an inner side of the polygonal frame and outer end coupling shafts located on an outer side of the polygonal frame. Adjacent two of the extendable arms are pivotally coupled by a common one of the inner end coupling shafts at every corner of the polygon.

The variable length coupling member that couples the first extendable arm and the second extendable arm which are located opposite to each other has its one end coupled to the outer end coupling shaft, the middle coupling shaft, or the inner end coupling shaft of the first extendable arm and has the other end coupled to the outer end coupling shaft, the middle coupling shaft, or the inner end coupling shaft of the second extendable arm.

In one embodiment, the variable length coupling member includes a first adjustment member and a second adjustment member which can slide relative to each other. Preferably, the first adjustment member is a tube member, and the second adjustment member is a core member slidably fitted in the tube member.

In a preferred embodiment, the first adjustment member is coupled to the outer end coupling shaft of the first extendable arm, and the second adjustment member is coupled to the outer end coupling shaft of the second extendable arm. The first adjustment member has a first guide slit that slidably receives the inner end coupling shaft of the first extendable arm, and the second adjustment member has a second guide slit that slidably receives the inner end coupling shaft of the second extendable arm.

A variable shape three-dimensional structure according to the present invention includes: a longitudinal coupling member that holds two of the variable shape frames according to any of the above configurations such that the two variable shape frames are separated from each other in a vertical direction and parallel to each other.

In a preferred embodiment, the longitudinal coupling member is formed by the common inner end coupling shaft extending in the vertical direction so as to couple the upper and lower variable shape frames.

According to the invention having the above configuration, the shape of a polygonal frame and the shape of a three-dimensional shape can be changed according to an extending/contracting operation of extendable arms.

DESCRIPTION OF EMBODIMENTS

Figure 1:
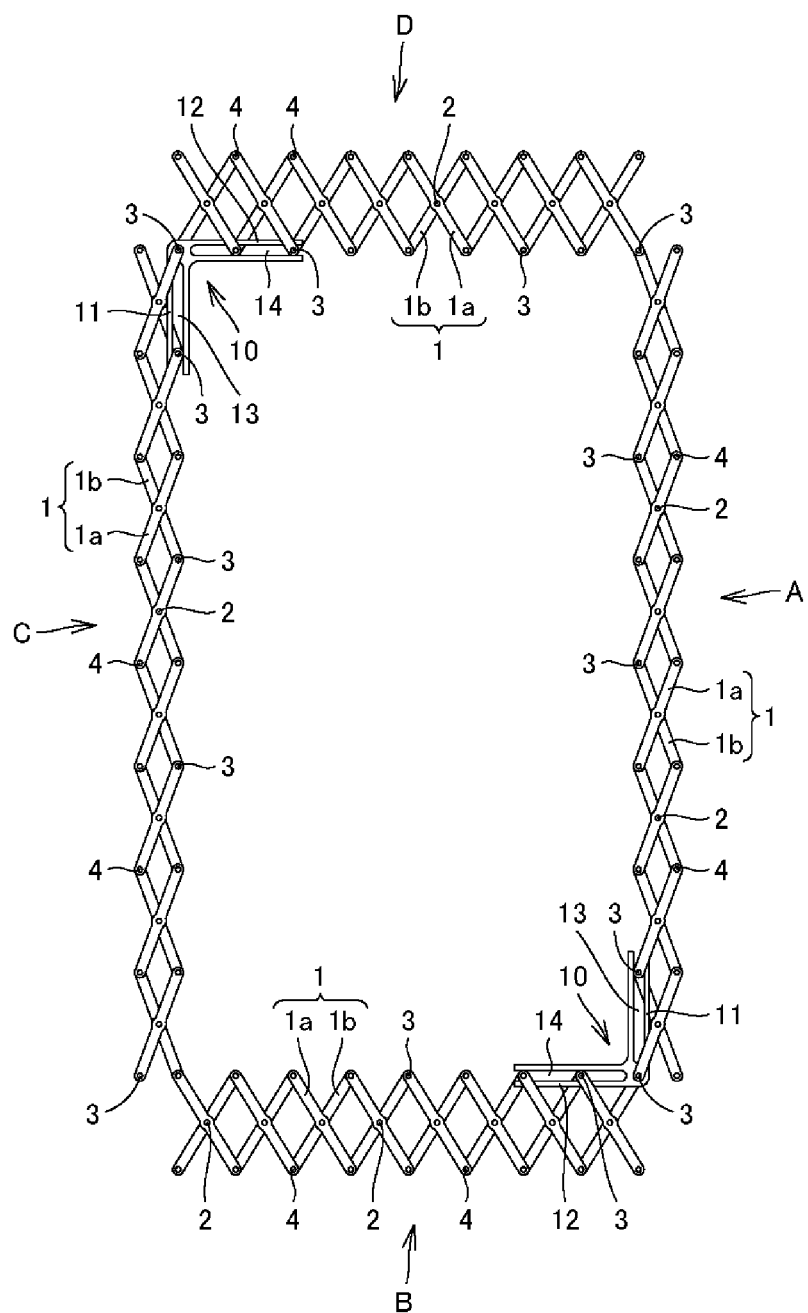
FIG. 1 is a plan view of a quadrilateral frame according to an embodiment of the present invention.
Figure 2:
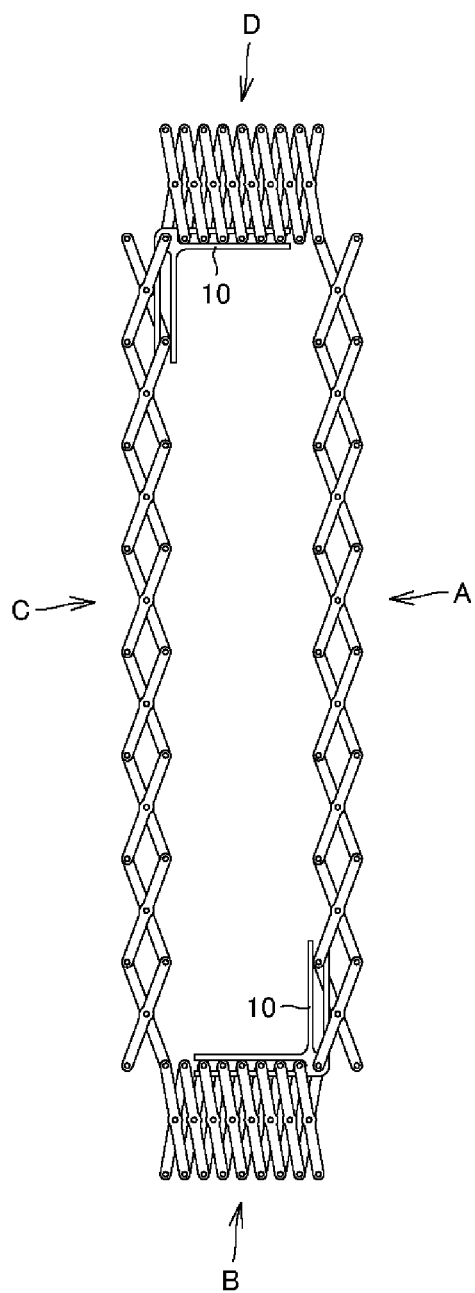
FIG. 2 is a plan view of the quadrilateral frame whose shape has been changed from the shape shown in FIG. 1.

Embodiment Shown in FIGS. 1 and 2

FIGS. 1 and 2 show a quadrilateral frame as an example of a variable shape frame. The variable shape frame to which the present invention is applied basically has a polygonal shape. Examples of polygons include a triangle, a pentagon, a hexagon, etc. in addition to a quadrilateral. The shape of the quadrilateral frame shown in FIG. 1 is different from that of the quadrilateral frame shown in FIG. 2. Specifically, the quadrilateral frame shown in FIG. 1 is longer in the lateral direction (horizontal direction) than the quadrilateral frame shown in FIG. 2.

The quadrilateral frame shown in FIGS. 1 and 2 is a frame whose shape can be changed. The quadrilateral frame includes four extendable arms A, B, C, D forming the four sides of the quadrilateral, and two corner members 10 located at two opposite ones of the four corners of the quadrilateral. The lengths of the sides change according to an extending/contracting operation of the extendable arms A, B, C, D, so that the shape or size of the quadrilateral frame changes accordingly. The angles of the corners of the quadrilateral frame do not change even when the shape or size of the quadrilateral frame changes.

Each extendable arm A, B, C, D includes a plurality of cross units 1 and an end coupling portion. Each cross unit 1 is formed by two rigid members 1a, 1b crossing each other in an X-shape and pivotally coupled by a middle coupling shaft 2. The end coupling portion pivotally couples the ends of adjacent ones of the cross units 1.

In the illustrated embodiment, the end coupling portion includes inner end coupling shafts 3 and outer end coupling shafts 4. The inner end coupling shafts 3 are located on the inner side of the quadrilateral frame, and the outer end coupling shafts 4 are located on the outer side of the quadrilateral frame. Regarding the shape of each rigid member as a component of the cross unit 1, an imaginary line connecting the inner end coupling shaft 3, the middle coupling shaft 2, and the outer end coupling shaft 4 is straight as viewed in top plan. The rigid member may have any shape as long as the imaginary line connecting these three coupling shafts is straight as viewed in plan. The rigid member may have a curved shape like S-shape or Z-shape as viewed in plan, or may have a shape curved in an arc in the thickness direction thereof.

In the following description of embodiments, the expression "straight" or "linear" as viewed in plan refers to any shape that is linear as viewed in plan and includes shapes curved as viewed from the side.

As shown in the figures, adjacent two of the extendable arms are pivotally coupled by a common inner end coupling shaft 3 at every corner of the quadrilateral frame.

The corner member 10 located between the first extendable arm A and the second extendable arm B which are adjacent to each other has a first guide portion and a second guide portion. The first guide portion linearly guides two or more of the inner end coupling shafts 3, two or more of the middle coupling shafts 2, or two or more of the outer end coupling shafts 4 of the first extendable arm A in the longitudinal direction of the side of the quadrilateral frame. The second guide portion linearly guides two or more of the inner end coupling shafts 3, two or more of the middle coupling shafts 2, or two or more of the outer end coupling shafts 4 of the second extendable arm B in the longitudinal direction of the side of the quadrilateral frame.

The two corner members 10 located at the opposite corners have the same shape and function.

The shape of the corner member 10 will be described in detail. The corner member 10 includes a first straight member 11 and a second straight member 12. The first straight member 11 extends in the longitudinal direction of the side formed by the first extendable arm A. The second straight member 11 extends in the longitudinal direction of the side formed by the second extendable arm B. The first guide portion is a slit 13 extending from a distal end toward a proximal end of the first straight member 11, and the second guide portion is a slit 14 extending from a distal end toward a proximal end of the second straight member 12.

In the illustrated embodiment, the common inner end coupling shaft 3 pivotally coupling the first extendable arm A and the second extendable arm B is attached to the corner of the corner member 10. The first guide portion 13 formed in the first straight member 11 linearly guides two or more of the inner end coupling shafts 3 of the first extendable arm A in the longitudinal direction of the side formed by the first extendable arm A. The second guide portion 14 formed in the second straight member 12 linearly guides two or more of the inner end coupling shafts 3 of the second extendable arm B in the longitudinal direction of the side formed by the second extendable arm B.

As two or more of the inner end coupling shafts 3 which are located in one end region of the first extendable arm A are linearly guided by the first guide portion 13, the entire first extendable arm A linearly extends and contracts accordingly in the longitudinal direction of the side formed by the first extendable arm A. As two or more of the inner end coupling shafts 3 which are located in one end region of the second extendable arm B are linearly guided by the second guide portion 14, the entire second extendable arm B linearly extends and contracts accordingly in the longitudinal direction of the side formed by the second extendable arm B.

Since the two corner members 10 located at the opposite corners guide the inner end coupling shafts 3 so that each extendable arm A, B, C, D extends and contracts linearly, the shape or size of the quadrilateral can be changed without changing the angle of each corner of the quadrilateral. FIG. 2 shows the quadrilateral frame with the second and fourth extendable arms B, D contracted to the maximum extent possible.

In the embodiment shown in FIGS. 1 and 2, the corner members 10 are disposed at two opposite corners of the quadrilateral. However, in another embodiment, the corner members may be disposed at all four corners of the quadrilateral.

In still another embodiment, the first guide member 13 and the second guide member 14 may guide the middle coupling shafts 2 or the outer end coupling shafts 4 instead of the inner end coupling shafts 3 of the extendable arm.

Figure 3:
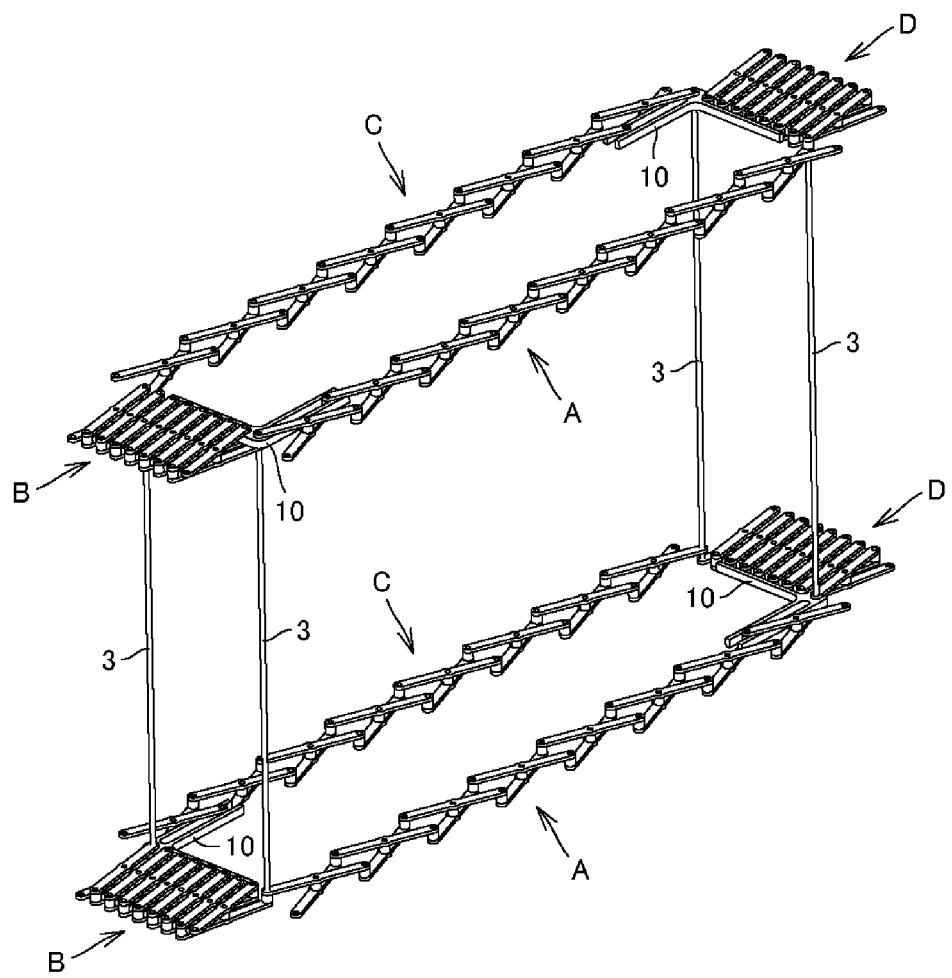
FIG. 3 is a perspective view of a variable shape three-dimensional structure according to an embodiment of the present invention.
Figure 4:
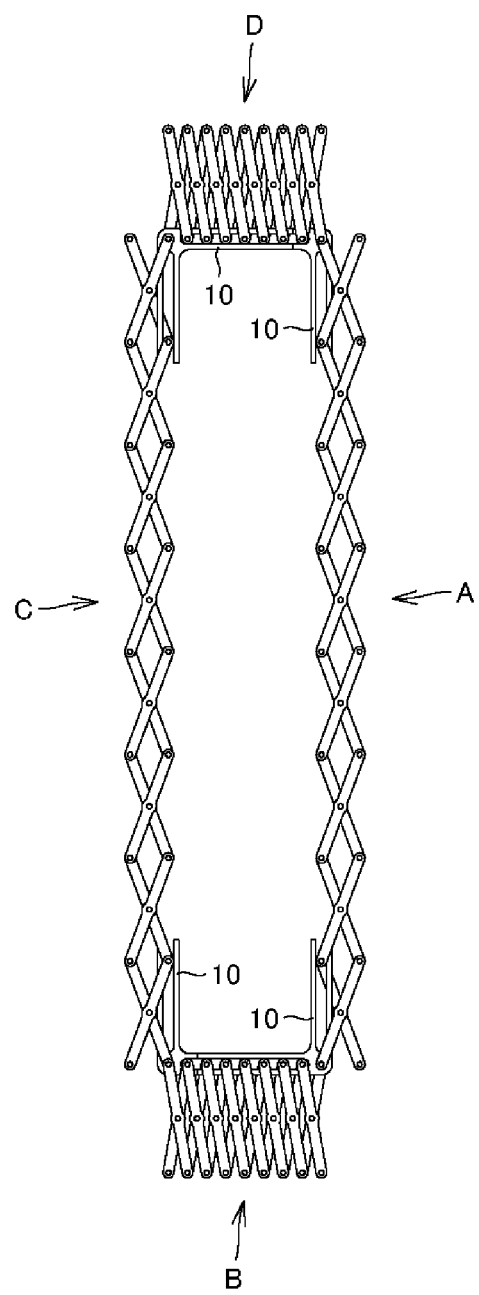
FIG. 4 is a plan view of the variable shape three-dimensional structure shown in FIG. 3.

Embodiment Shown in FIGS. 3 and 4

FIGS. 3 and 4 show a variable shape three-dimensional structure. The variable shape three-dimensional structure includes a longitudinal coupling member that holds two of the variable shape frames according to the embodiment of the present invention such that the two variable shape frames are separated from each other in the vertical direction and parallel to each other.

In the illustrated embodiment, two of the quadrilateral frames shown in FIGS. 1 and 2 are coupled by four longitudinal coupling members. Each longitudinal coupling member is a common inner end coupling shaft 3 extending in the vertical direction so as to couple the upper and lower quadrilateral frames.

The two corner members 10 of the upper quadrilateral frame are located at two opposite corners of the upper quadrilateral frame, and the two corner members 10 of the lower quadrilateral frame are located at two opposite corners of the lower quadrilateral frame which are located at different positions from the two opposite corners of the upper quadrilateral frame.

In the illustrated embodiment shown in FIGS. 3 and 4, the longitudinal coupling members are four inner end coupling shafts 3 extending in the vertical direction. However, the middle coupling shafts and/or the outer end coupling shafts may extend in the vertical direction so as to serve as the longitudinal coupling members.

The shape or size of the variable shape three-dimensional structure changes according to an extending/contracting operation of each extendable arm. In the illustrated embodiment, the longitudinal coupling members have a fixed length. However, the longitudinal coupling members may be variable height longitudinal coupling members whose vertical height can be adjusted.

Figure 5:
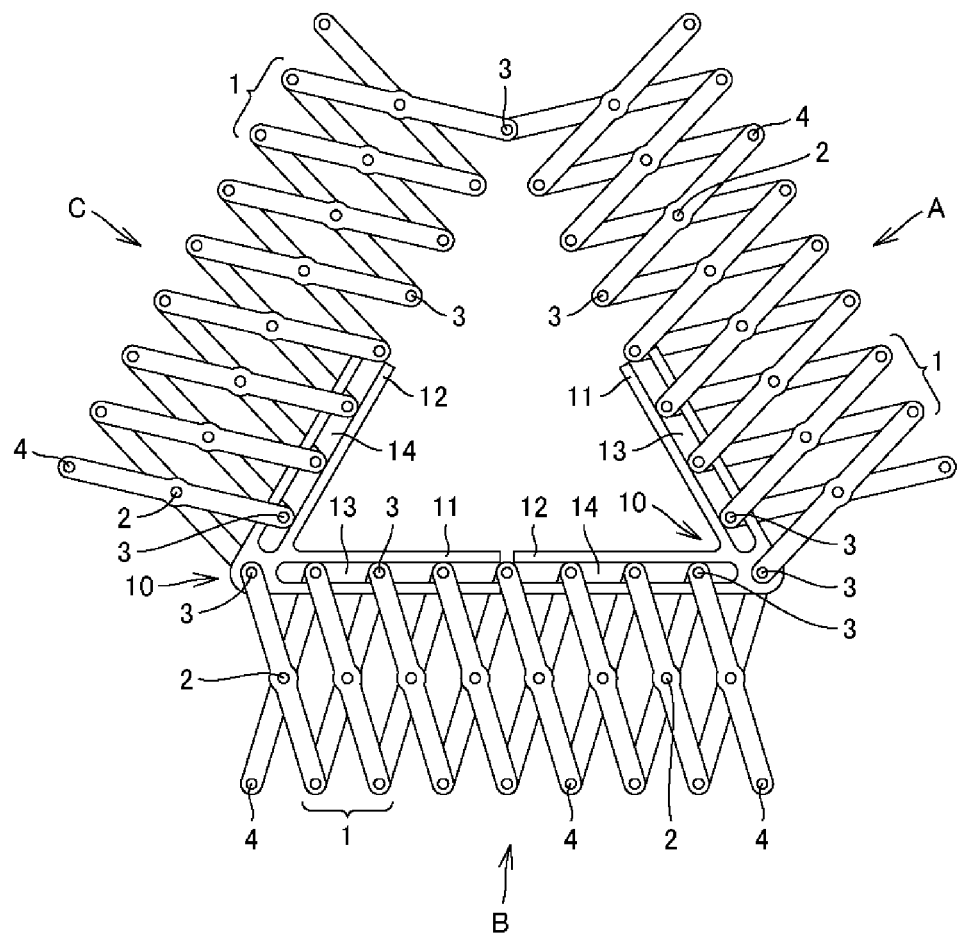
FIG. 5 is a plan view of a triangular frame according to another embodiment of the present invention.
Figure 6:
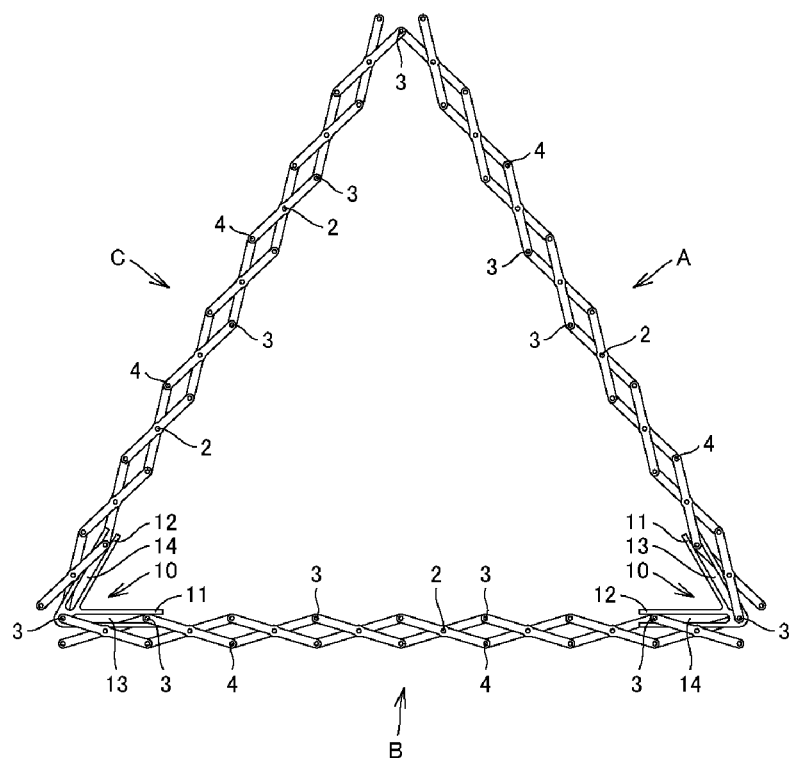
FIG. 6 is a plan view of the triangular frame whose shape has been changed from the shape shown in FIG. 5.

Embodiment Shown in FIGS. 5 and 6

FIGS. 5 and 6 show an equilateral triangular frame as another example of the polygonal frame. Those elements which are substantially the same as those in the above embodiments are denoted with the same reference characters as those in the above embodiments.

This equilateral triangular frame includes three extendable arms A, B, C forming each side of the triangle, and corner members 10 located at two corners of the triangle. Each extendable arm A, B, C includes the same number of cross units 1, and the angle of each corner is 60 degrees. The extendable arms A, B, C and the corner members 10 thus form an equilateral triangular frame whose three sides all have the same length.

The first guide portion 13 of one corner member 10 linearly guides two or more of the inner end coupling shafts 3 of the first extendable arm A in the longitudinal direction of the side formed by the first extendable arm A. The second guide portion 14 of the one corner member 10 linearly guides two or more of the inner end coupling shafts 3 of the second extendable arm B in the longitudinal direction of the side formed by the second extendable arm B. The first guide portion 13 of the other corner member 10 linearly guides two or more of the inner end coupling shafts 3 of the second extendable arm B in the longitudinal direction of the side formed by the second extendable arm B. The second guide portion 14 of the other corner member 10 linearly guides two or more of the inner end coupling shafts 3 of the third extendable arm C in the longitudinal direction of the side formed by the third extendable arm C. The first guide portion 13 and the second guide portion 14 meet at an angle of 60 degrees.

Extending the extendable arms A, B, C of the equilateral triangular frame shown in FIG. 5 changes this equilateral triangular frame into a large equilateral triangular frame as shown in FIG. 6. Since the two corner members 10 restrict the angles of the triangle, the size of the equilateral frame is changed while maintaining the shape thereof.

Figure 7:
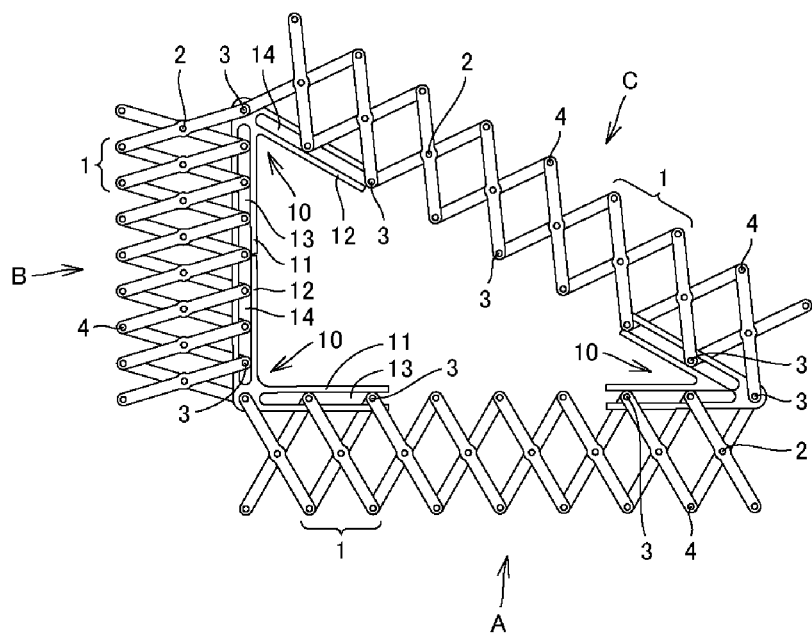
FIG. 7 is a plan view of a right triangular frame according to still another embodiment of the present invention.
Figure 8:
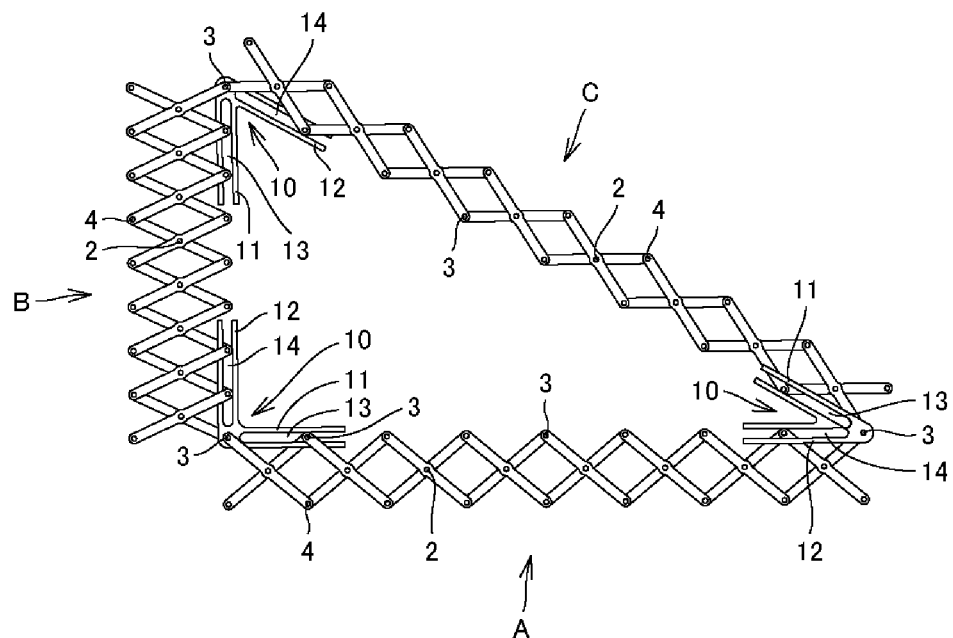
FIG. 8 is a plan view of the right triangular frame whose shape has been changed from the shape shown in FIG. 7.

Embodiment Shown in FIGS. 7 and 8

FIGS. 7 and 8 show a right triangular frame. The right triangular frame includes three extendable arms A, B, C forming the three sides of the triangle, and three corner members 10 located at all three corners of the triangle. The first guide portion 13 and the second guide portion 14 of the corner member 10 located between the first extendable arm A and the second extendable arm B meet at an angle of 90 degrees.

The right triangular frame shown in FIG. 8 is larger than the right triangular frame shown in FIG. 7 as each of the extendable arms A, B, C has been extended to a greater length than in the right triangular frame shown in FIG. 7. Since the angle of each corner of the triangle is fixed by the corner members 10, the triangle is enlarged or reduced so that the enlarged or reduced triangle is similar to the original triangle.

Figure 9:
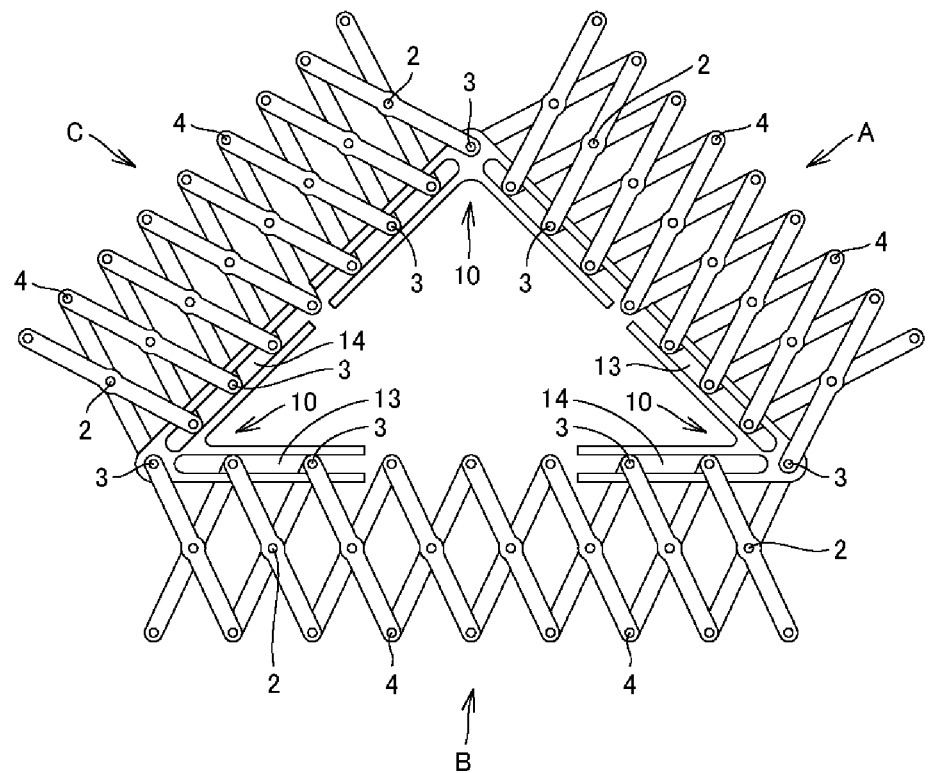
FIG. 9 is a plan view of an isosceles triangular frame according to yet another embodiment of the present invention.
Figure 10:
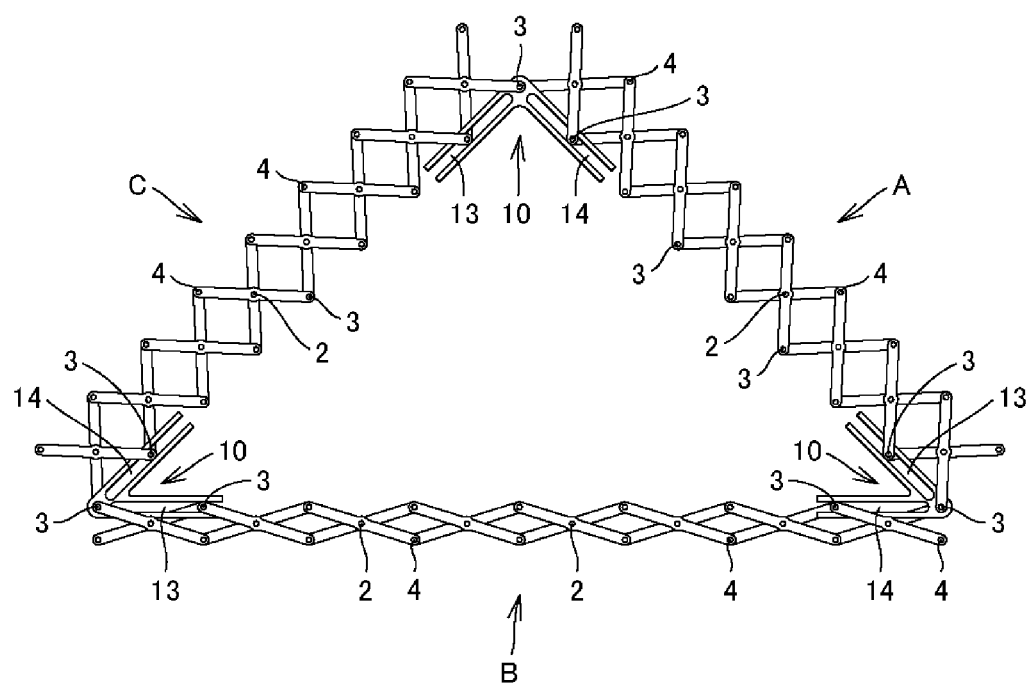
FIG. 10 is a plan view of the isosceles triangular frame whose shape has been changed from the shape shown in FIG. 9.

Embodiment Shown in FIGS. 9 and 10

FIGS. 9 and 10 show an isosceles triangular frame. The isosceles triangular frame includes three extendable arms A, B, C forming the three sides of the triangle, and three corner members 10 located at all three corners of the triangle. The corner member 10 located between the first extendable arm A and the second extendable arm B and the corner member 10 located between the second extendable arm B and the third extendable arm C have the same shape with the same bend angle.

The isosceles triangular frame shown in FIG. 10 is larger than the isosceles triangular frame shown in FIG. 9 as each of the extendable arms A, B, C has been extended to a greater length than in the isosceles triangular frame shown in FIG. 9. Since the angle of each corner of the triangle is fixed by the corner members 10, the triangle is enlarged or reduced so that the enlarged or reduced triangle is similar to the original triangle.

Figure 11:
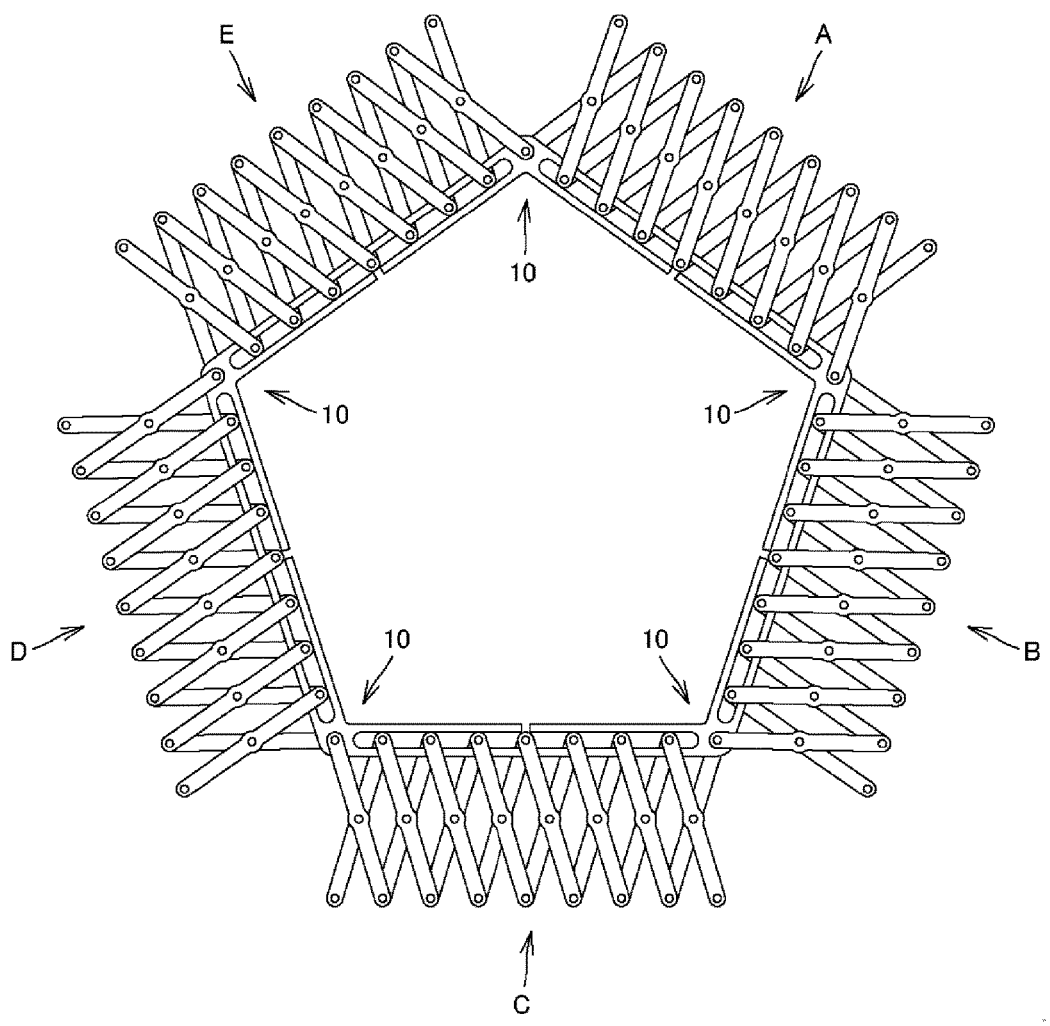
FIG. 11 is a plan view of a pentagonal frame according to a further embodiment of the present invention.
Figure 12:
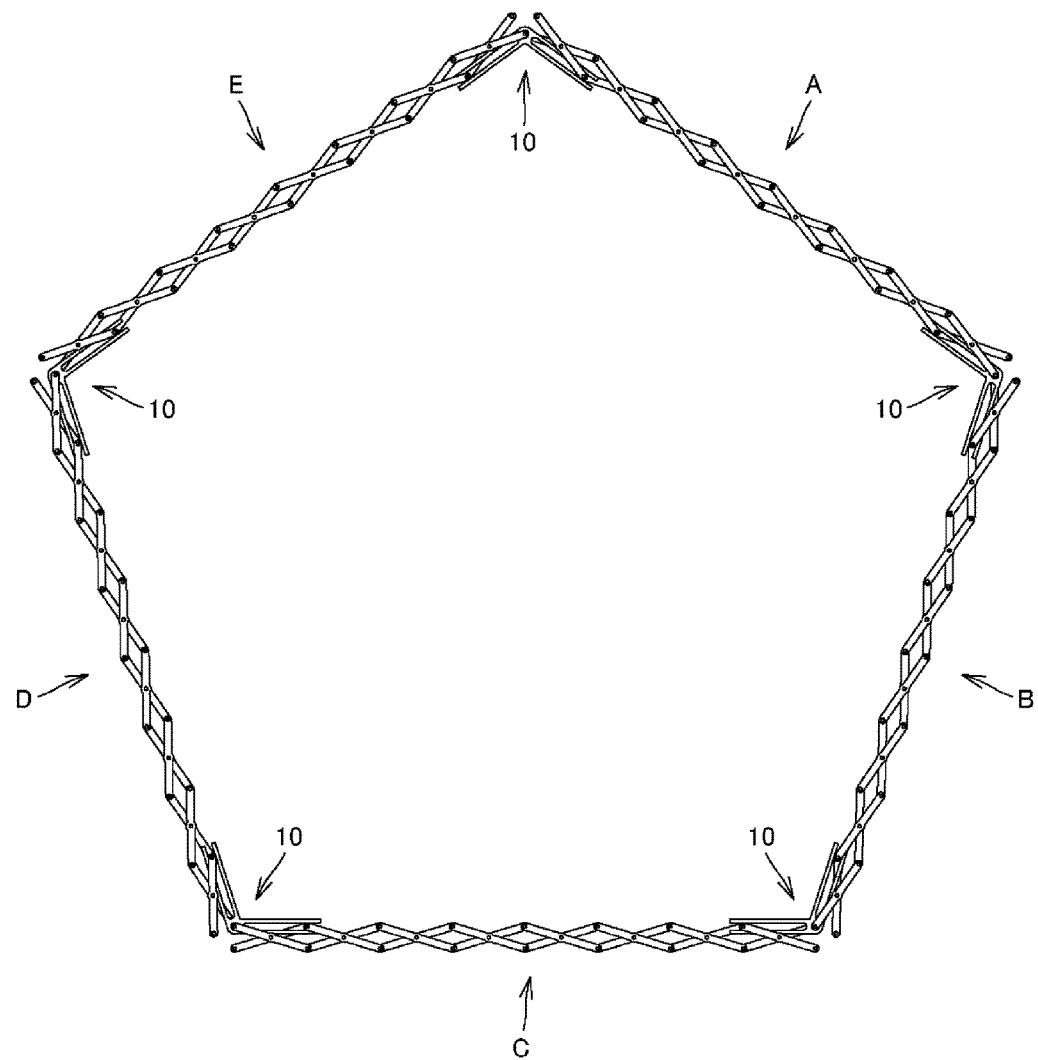
FIG. 12 is a plan view of the pentagonal frame whose shape has been changed from the shape shown in FIG. 11.
Figure 13:
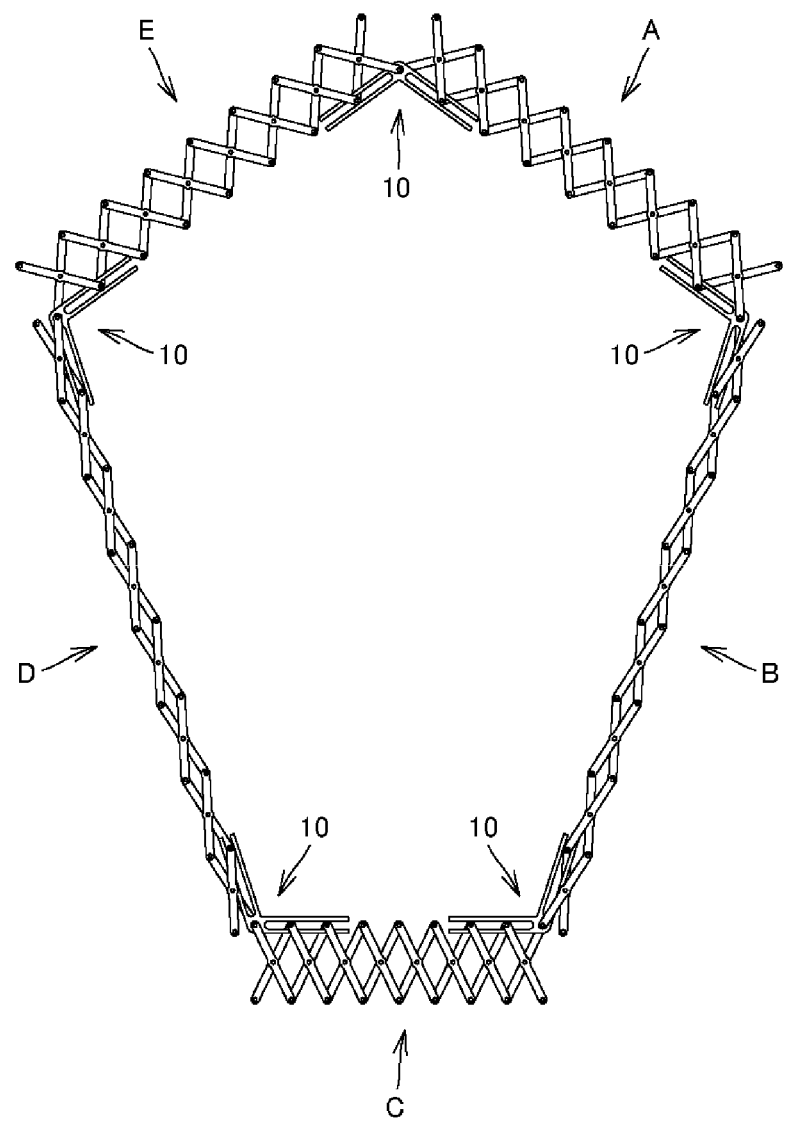
FIG. 13 is a plan view of the pentagonal frame whose shape has been changed from the shape shown in FIG. 12.

Embodiment Shown in FIGS. 11 to 13

FIGS. 11 to 13 show a pentagonal frame. The pentagonal frame includes five extendable arms A, B, C, D, E forming the five sides of the pentagon, and five corner members 10 located at all five corners of the pentagon. All of the corner members 10 have the same bend angle.

FIG. 11 shows the pentagonal frame in the shape of a regular pentagon with all the extendable arms A, B, C, D, E contracted to the same length. FIG. 12 shows the pentagonal frame in the shape of a regular pentagon with all the extendable arms A, B, C, D, E extended to the same length. FIG. 13 shows the pentagonal frame in the shape of a pentagon other than a regular pentagon with the extendable arms A, B, C, D, E having different lengths.

Embodiment Shown in FIGS. 14 to 17

FIGS. 14 to 17 show a hexagonal frame. The hexagonal frame includes six extendable arms A, B, C, D, E, F forming the six sides of the hexagon, and six corner members 10 located at all six corners of the hexagon. All of the corner members 10 have the same bend angle.

Figure 14:
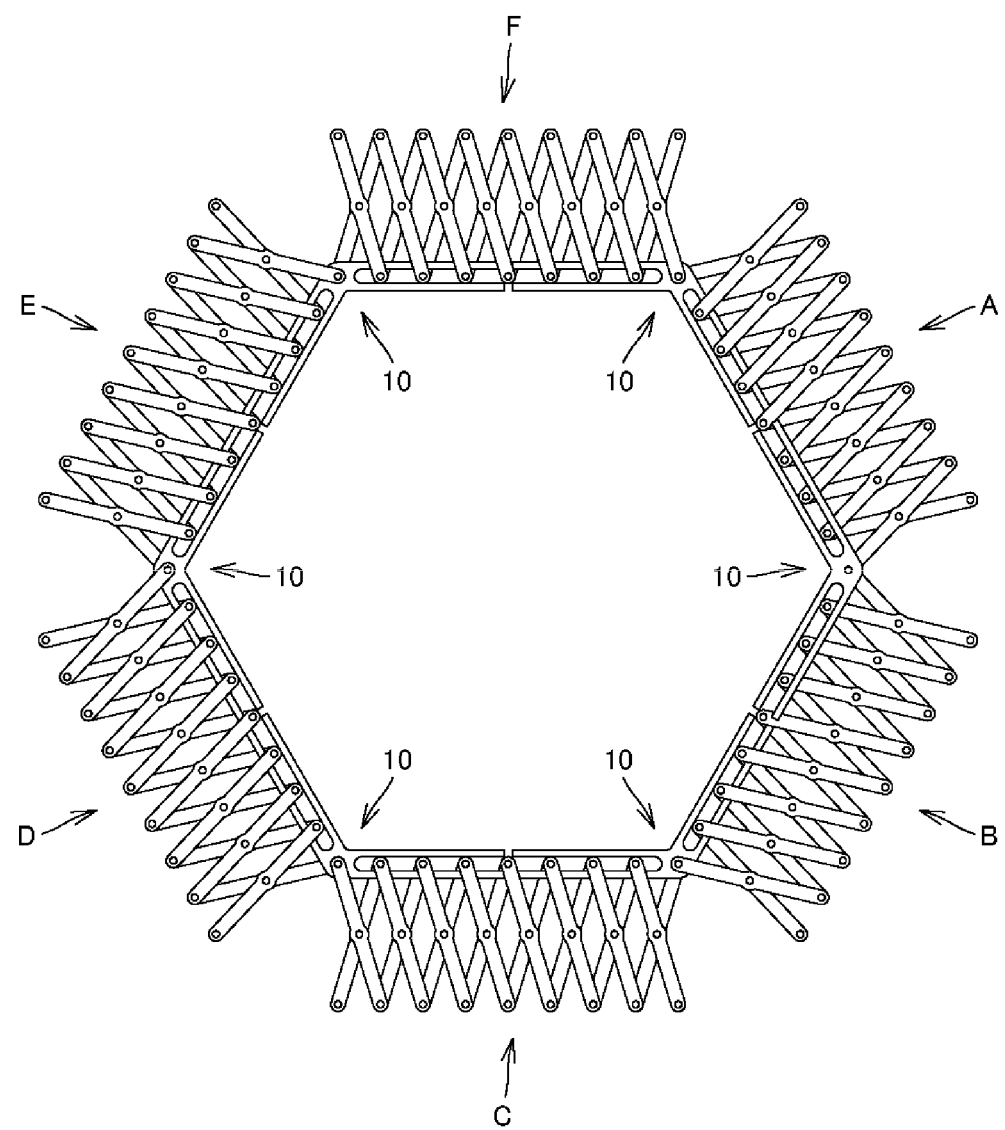
FIG. 14 is a plan view of a hexagonal frame according to a still further embodiment of the present invention.
Figure 15:
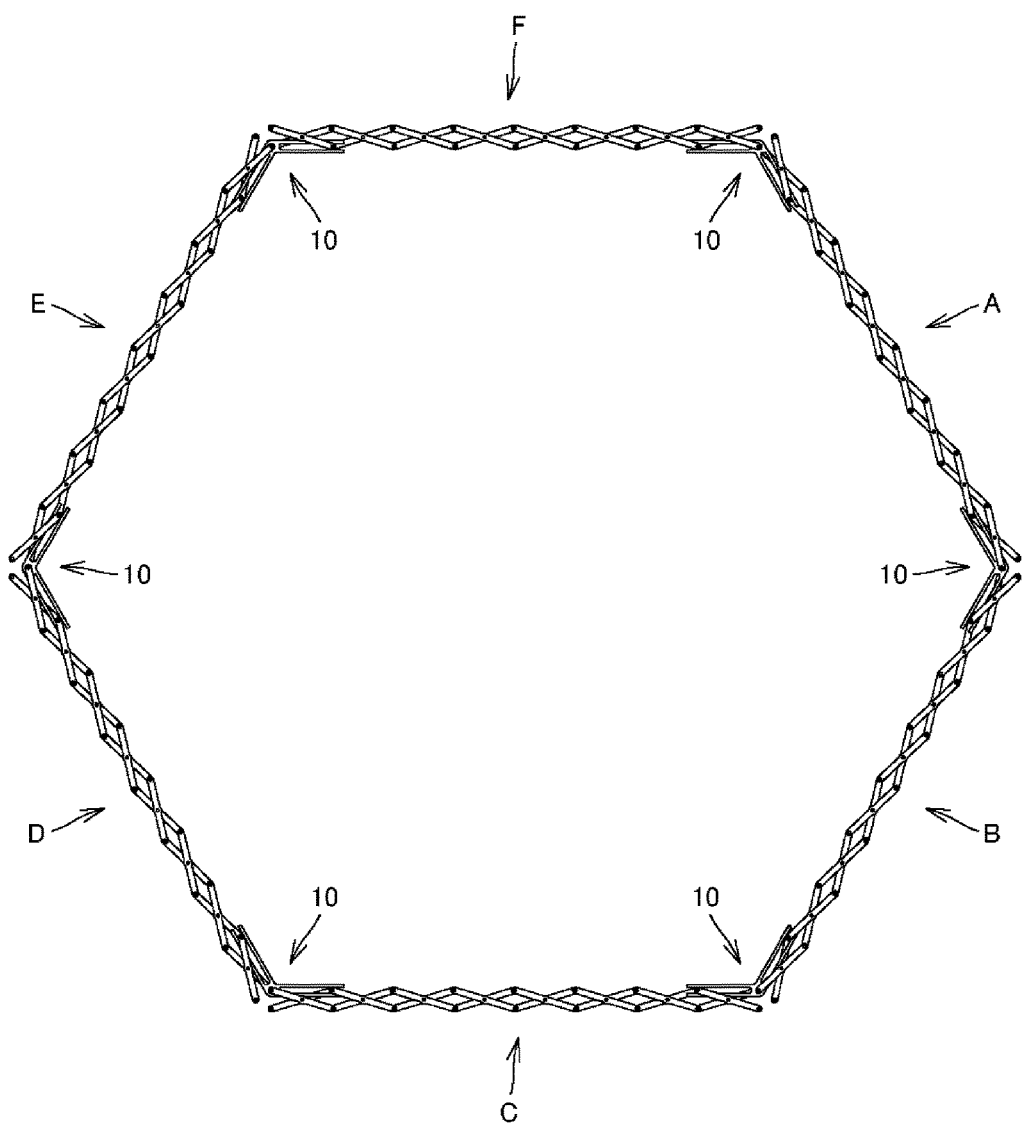
FIG. 15 is a plan view of the hexagonal frame whose shape has been changed from the shape shown in FIG. 14.
Figure 16:
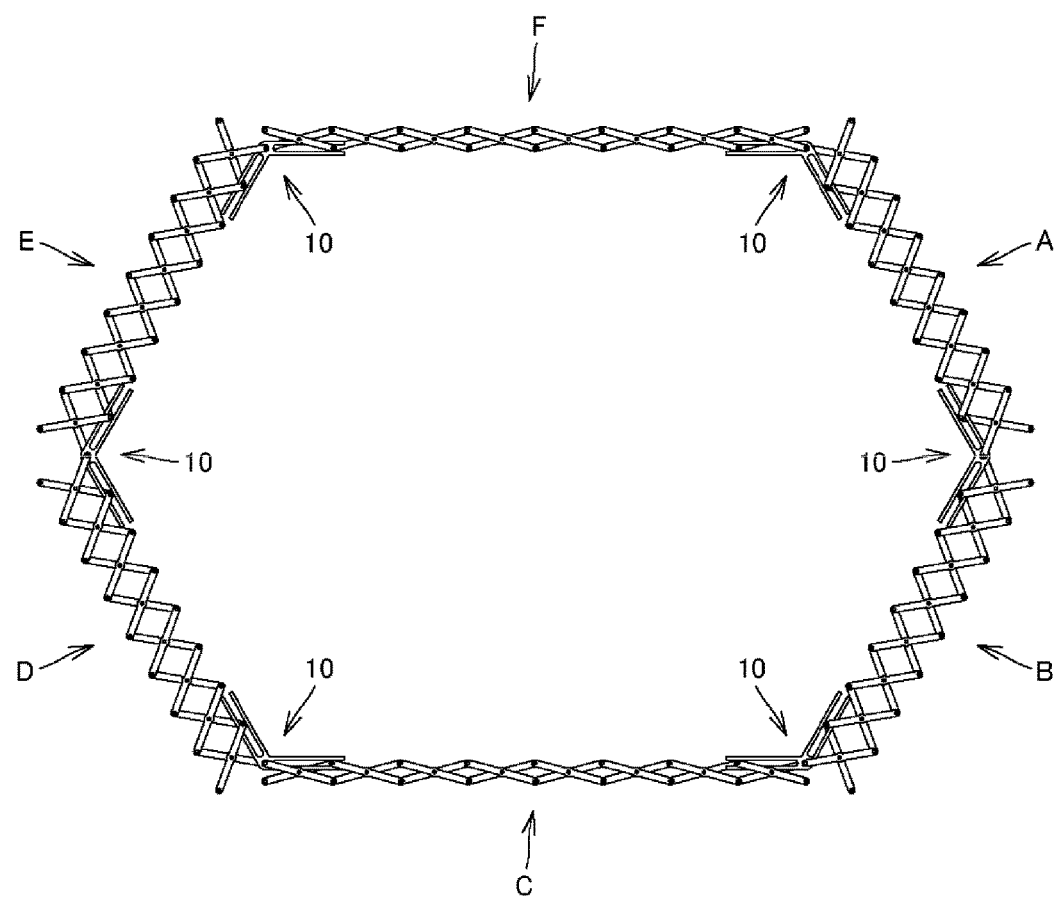
FIG. 16 is a plan view of the hexagonal frame whose shape has been changed from the shape shown in FIG. 15.
Figure 17:
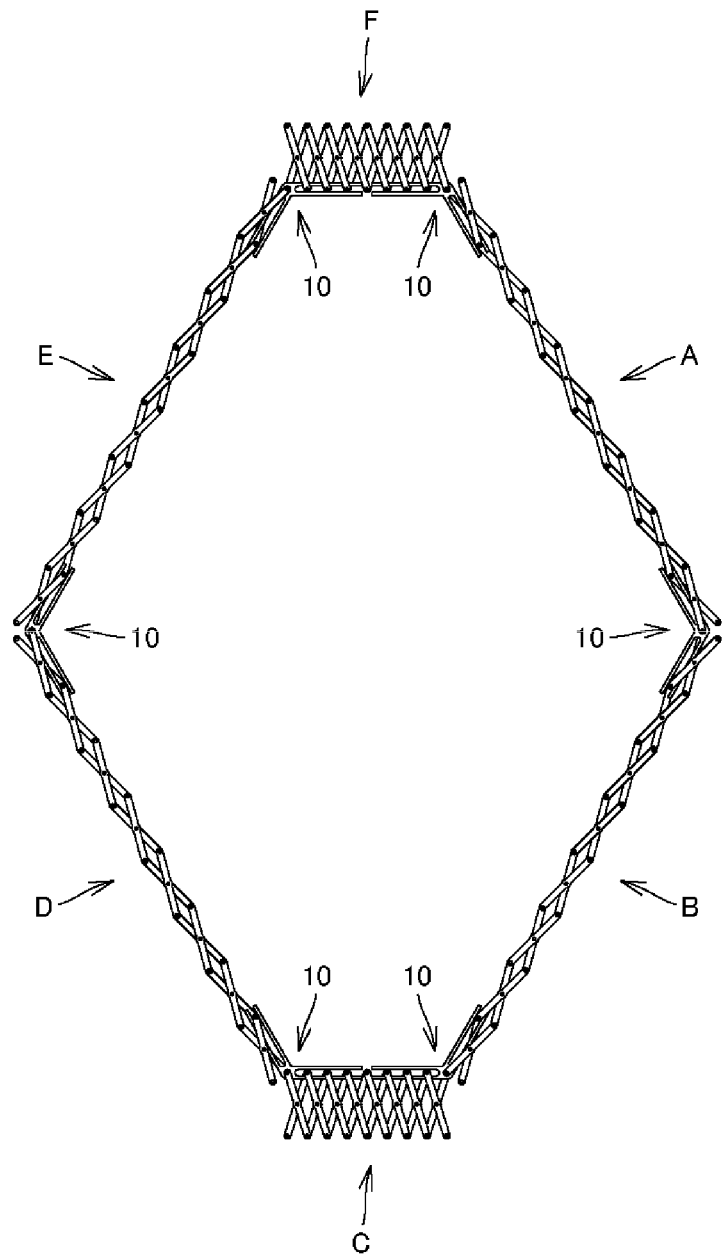
FIG. 17 is a plan view of the hexagonal frame whose shape has been changed from the shape shown in FIG. 16.

FIG. 14 shows the hexagonal frame with all the extendable arms A, B, C, D, E, F contracted to the same length. FIG. 15 shows the hexagonal frame with all the extendable arms A, B, C, D, E, F extended to the same length. Each of the hexagonal frames shown in FIGS. 16 and 17 is in the shape of a hexagon other than a regular hexagon with the lengths of the extendable arms A, B, C, D, E being varied as desired.

Figure 18:
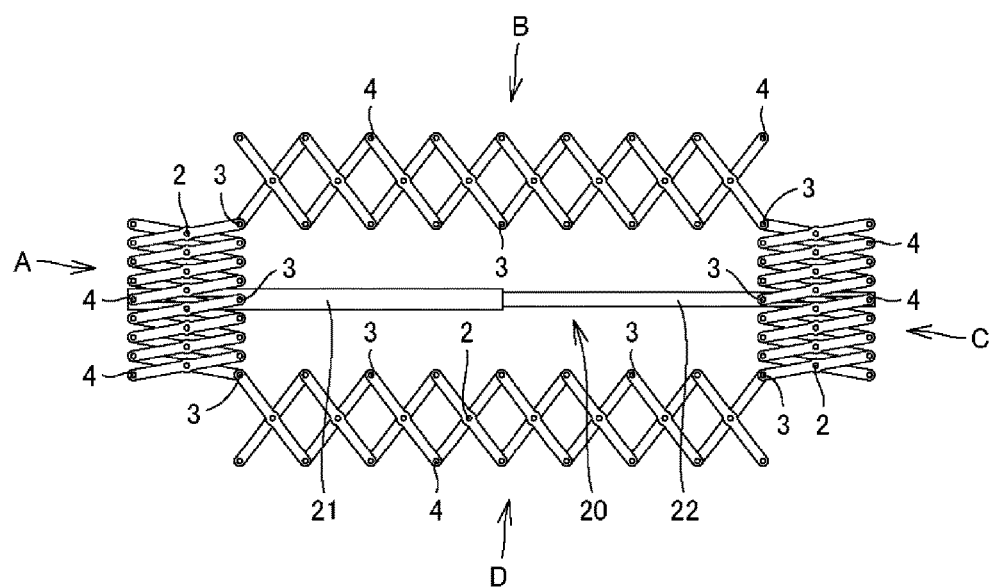
FIG. 18 is a plan view of a variable shape frame according to a yet further embodiment of the present invention.
Figure 19:
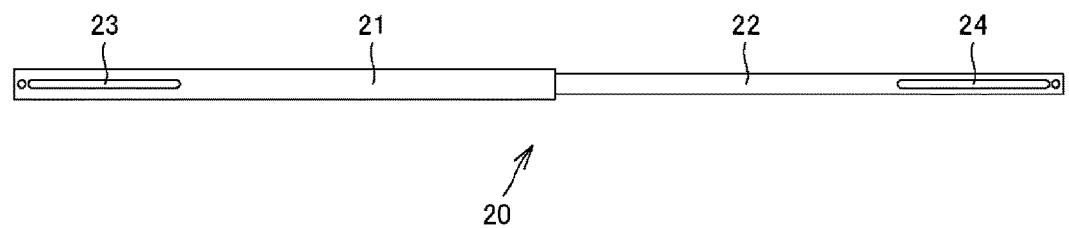
FIG. 19 is a plan view of a variable length coupling member.
Figure 20:
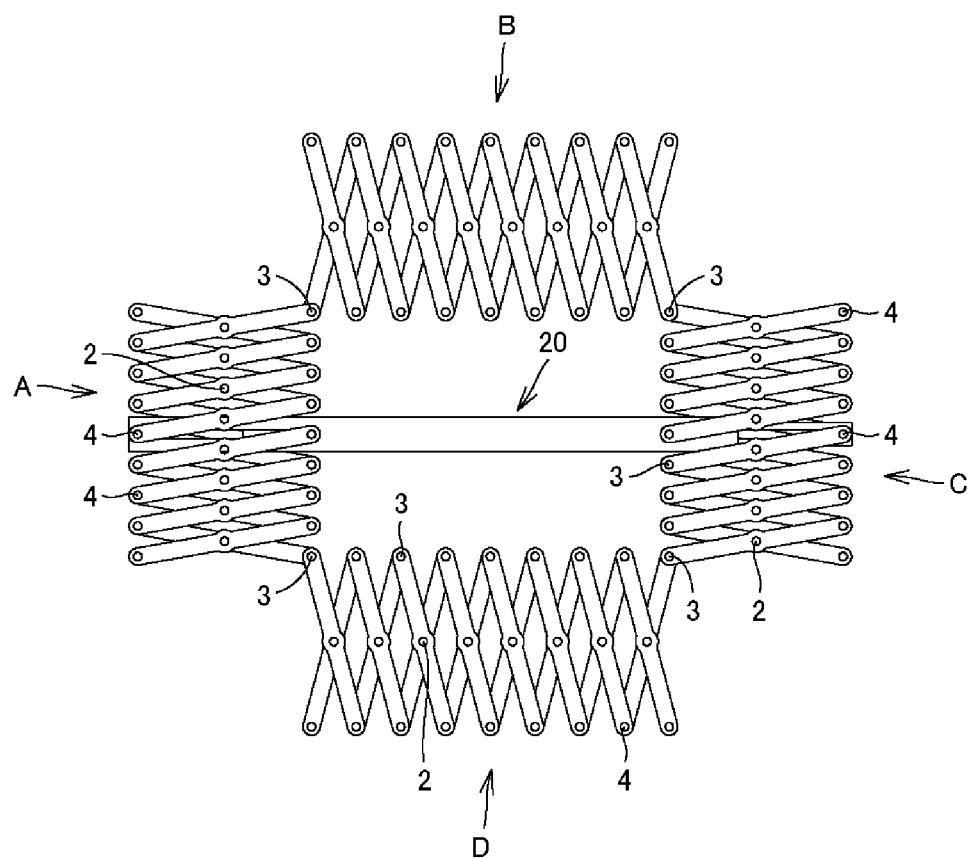
FIG. 20 is a plan view of the variable shape frame whose shape has been changed from the shape shown in FIG. 18.

Embodiment Shown in FIGS. 18 to 20

A variable shape frame according to an embodiment shown in FIGS. 18 to 20 is a polygonal frame that does not use any corner member. In the present embodiment, a quadrilateral frame is shown as an example of the polygonal frame. Those elements which are substantially the same as those in the above embodiments are denoted with the same reference characters as those in the above embodiments.

The variable shape frame having the shape of a quadrilateral shown in FIGS. 18 to 20 will be described in detail. The quadrilateral frame includes four extendable arms A, B, C, D forming the four sides of the quadrilateral, and a variable length coupling member 20 whose length can be changed and which couples the two extendable arms A, C forming at least two opposite sides of the quadrilateral frame. Each extendable arm A, B, C, D includes a plurality of cross units and an end coupling portion. Each cross unit is formed by two rigid members crossing each other in an X-shape and pivotally coupled by a middle coupling shaft 2. The end coupling portion pivotally couples the ends of adjacent ones of the cross units. The end coupling portion includes inner end coupling shafts 3 and outer end coupling shafts 4. The inner end coupling shafts 3 are located on the inner side of the quadrilateral frame, and the outer end coupling shafts 4 are located on the outer side of the quadrilateral frame.

As shown in the figures, adjacent two of the extendable arms are pivotally coupled by a common inner end coupling shaft 3 at every corner of the quadrilateral.

The variable length coupling member 20 extends between the first extendable arm A and the third extendable arm C which are located opposite to each other. The variable length coupling member 20 has its one end coupled to one outer end coupling shaft 4 of the first extendable arm A and the other end coupled to one outer end coupling shaft 4 of the third extendable arm C.

Both ends of the variable length coupling member 20 may be coupled to two middle coupling shafts 2 or two inner end coupling shafts 3 of two opposite extendable arms, instead of being coupled to two outer end coupling shafts 4 of two opposite extendable arms.

The variable length coupling member 20 may have any structure as long as the overall length of the variable length coupling member 20 can be changed. In the illustrated embodiment, the variable length coupling member 20 includes a first adjustment member 21 and a second adjustment member 22 which can slide relative to each other. The first adjustment member 21 is a tube member and the second adjustment member 22 is a core member slidably fitted in the tube member 21.

Preferably, the variable length coupling member 20 extends parallel to two sides of the quadrilateral, namely the second extendable arm B and the fourth extendable arm D. Accordingly, the second extendable arm B and the fourth extendable arm D stably extend and contract along the sides of the quadrilateral as the length of the variable length coupling member 20 is changed.

In order to stably change the shape or size of the quadrilateral frame while keeping the angles of the corners of the quadrilateral at 90 degrees, the variable length coupling member 20 of the present embodiment is configured as follows. As shown in FIG. 19, the tube member 21 as the first adjustment member has a first guide slit 23 that slidably receives the inner end coupling shaft 3 of the first extendable arm A, and the core member 22 as the second adjustment member has a second guide slit 24 that slidably receives the inner end coupling shaft 3 of the third extendable arm B.

The variable length coupling member 20 having the first guide slit 23 and the second guide slit 24 always positions the outer end coupling shaft 4 and the inner end coupling shaft 3, which are located in the middle in the longitudinal direction of the first extendable arm A, and the outer end coupling shaft 4 and the inner end coupling shaft 3, which are located in the middle in the longitudinal direction of the third extendable arm C, on a straight line parallel to two sides of the quadrilateral, namely the second extendable arm B and the fourth extendable arm D. This allows the first extendable arm A and the third extendable arm C to stably extend and contract in the direction perpendicular to the two sides of the quadrilateral, namely the second extendable arm B and the fourth extendable arm D.

FIG. 18 shows the quadrilateral frame with the first and third extendable arms A, C contracted and the second and fourth extendable arms B, D extended moderately. FIG. 20 shows the quadrilateral frame with all of the extendable arms A, B, C, D contracted. The shape or size of the quadrilateral frame can be changed while keeping the angles of the corners at 90 degrees.

In the illustrated embodiment, the variable length coupling member 20 couples the first extendable arm A and the third extendable arm C. In another embodiment, the variable shape frame may include two variable length coupling members. In this case, one variable length coupling member couples the first extendable arm A and the third extendable arm C, and the other variable length coupling member couples the second extendable arm B and the fourth extendable arm D.

FIGS. 18 to 20 show a quadrilateral frame as an example of a polygonal frame. Substantially the same structure as that of this quadrilateral frame can be applied to other polygons such as a hexagon in which opposite sides are parallel.

Embodiment Shown in FIGS. 21 to 24

A variable shape three-dimensional structure shown in FIGS. 21 to 24 uses four of the variable shape frames 100 in the shape of a quadrilateral shown in FIG. 1. Specifically, the four variable shape frames 100 form four sides of a quadrangular prism.

The four variable shape frames 100 have the same structure. A longitudinal coupling member that holds the upper and lower variable shape frames 100 such that the upper and lower variable shape frames 100 are separated from and parallel to each other is formed by the first and second variable shape frames located opposite to each other.

As shown in the figures, each of the four variable shape frames 100 includes a corner member 10 that linearly guides first and second extendable arms, which are adjacent to each other, in the longitudinal directions of the sides formed by the first and second extendable arms. Since each of the variable shape frames 100 has the same structure as the variable shape frame shown in FIG. 1, detailed description thereof will be omitted.

In the present embodiment, the outer end coupling shafts of each of upper and lower ones of the extendable arms of the first variable shape frame forming the longitudinal coupling member are pivotally coupled to outer end coupling shafts of one of the extendable arms of the upper or lower variable shape frame via coupling members 30. The outer end coupling shafts of each of upper and lower ones of the extendable arms of the second variable shape frame forming the longitudinal coupling member are pivotally coupled to outer end coupling shafts of another one of the extendable arms of the upper or lower variable shape frame via coupling members 30.

Figure 21:
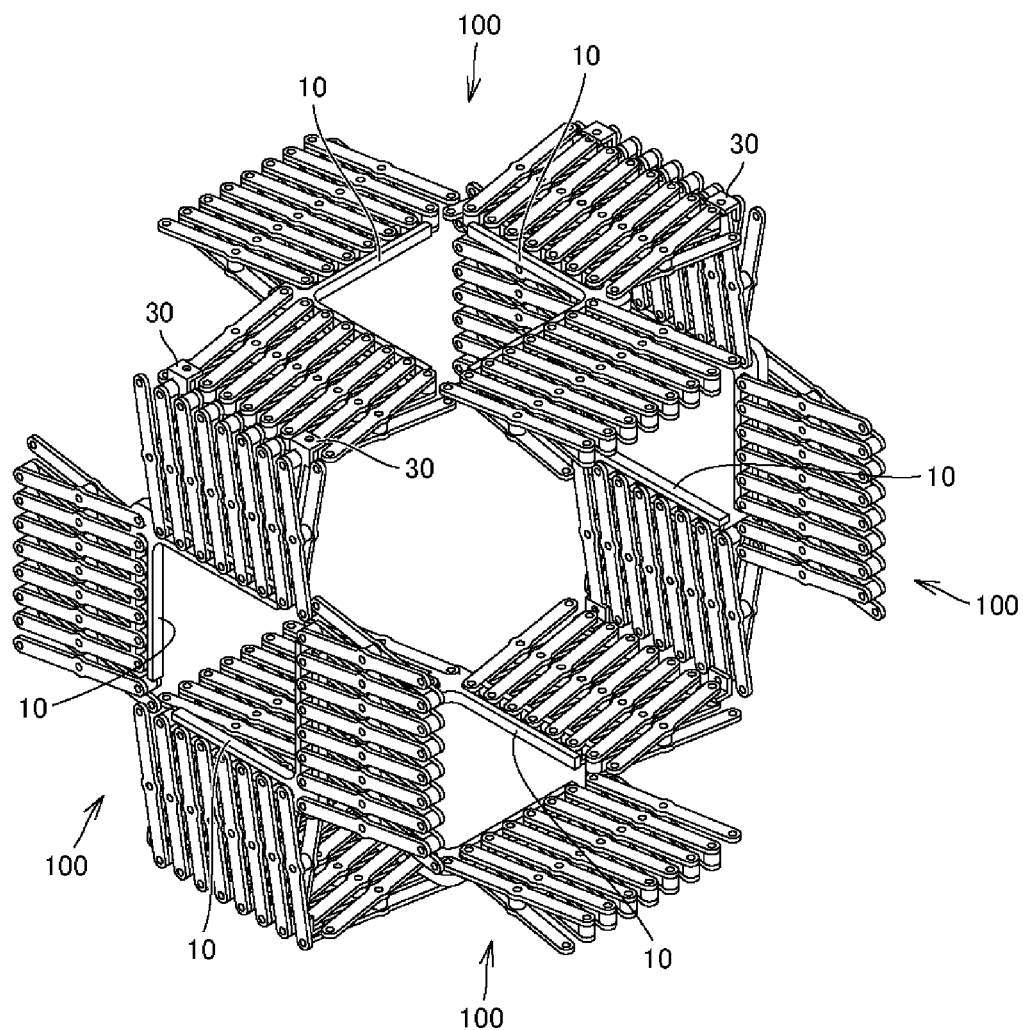
FIG. 21 is a perspective view of a variable shape three-dimensional structure according to another embodiment of the present invention.
Figure 22:
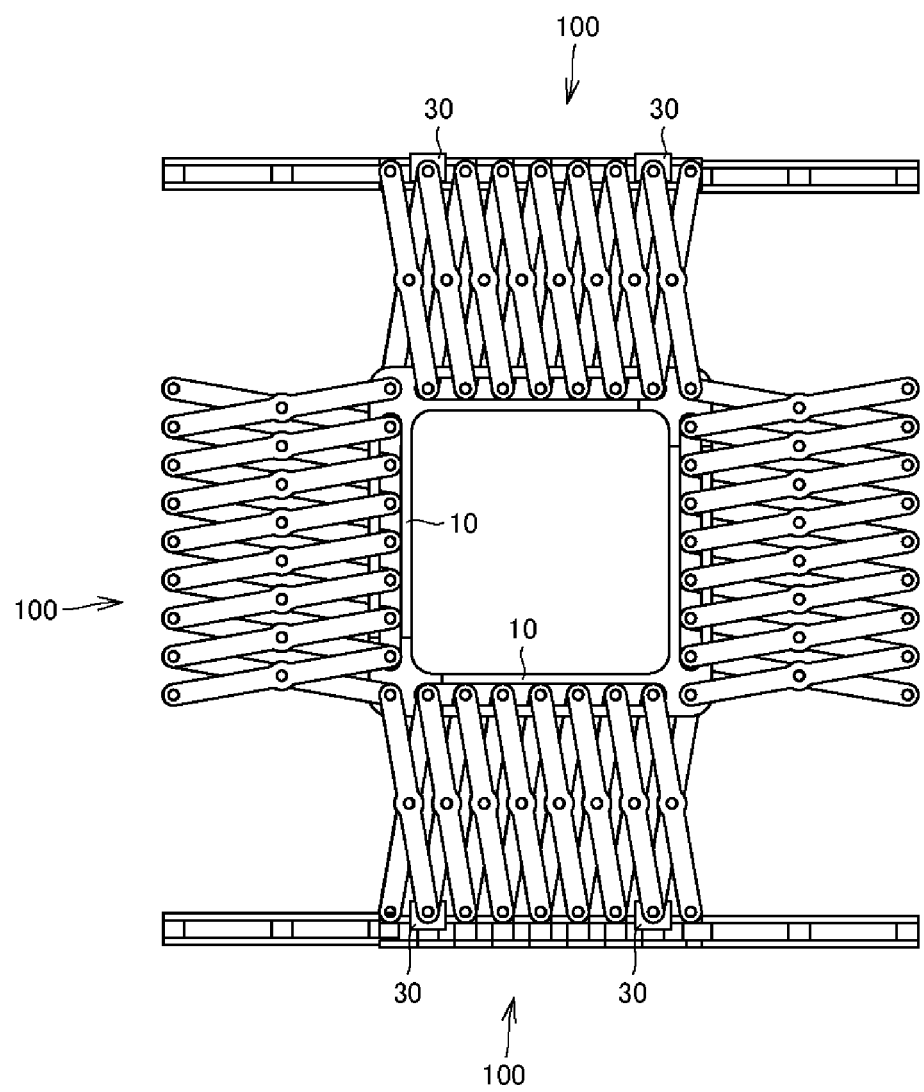
FIG. 22 is a plan view of the variable shape three-dimensional structure shown in FIG. 21.
Figure 23:
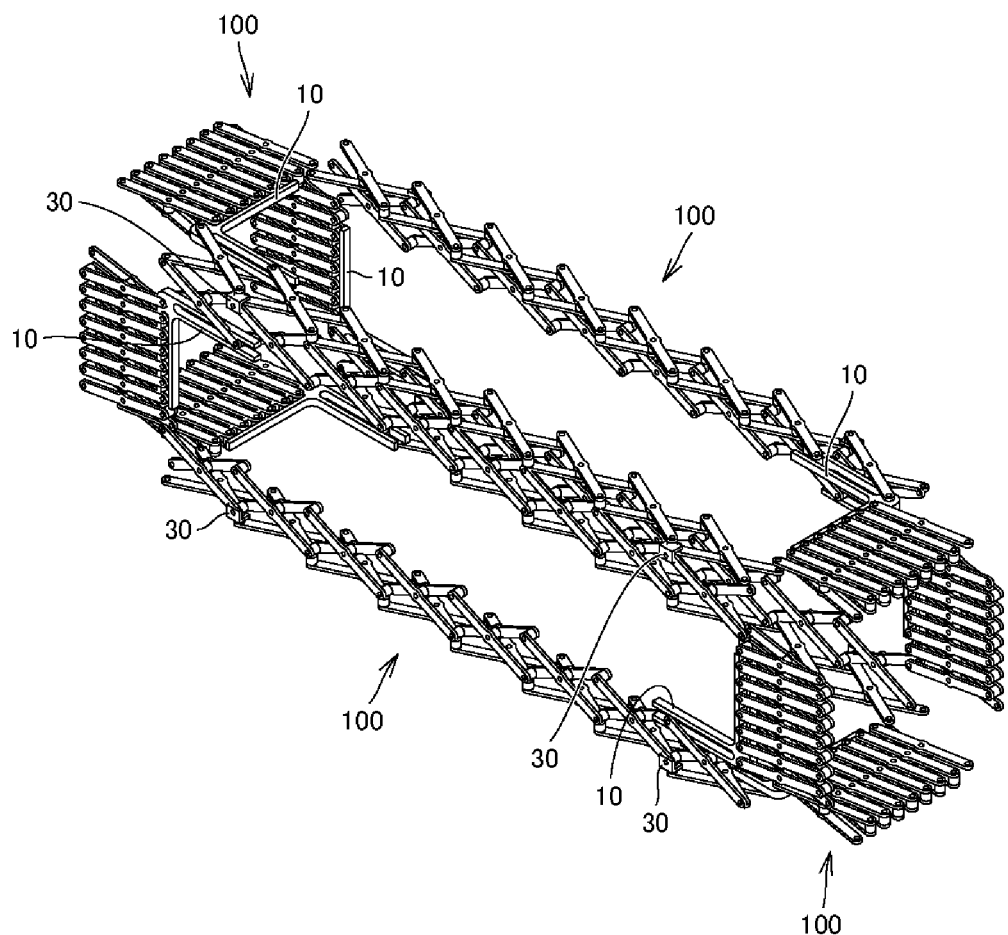
FIG. 23 is a perspective view of the variable shape three-dimensional structure whose shape has been changed from the shape shown in FIG. 21.
Figure 24:
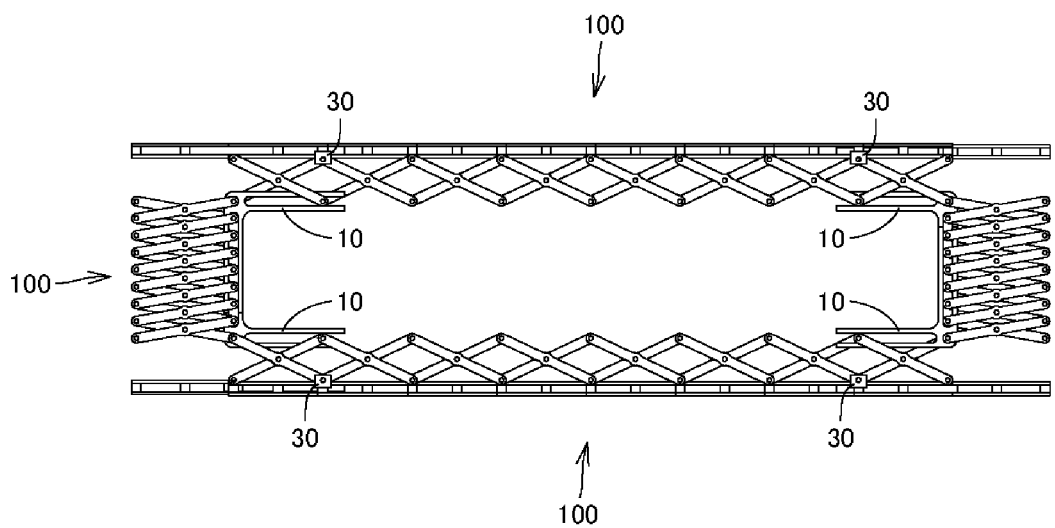
FIG. 24 is a plan view of the variable shape three-dimensional structure whose shape has been changed from the shape shown in FIG. 21.

FIGS. 21 and 22 show the variable shape three-dimensional structure with the smallest volume. FIGS. 23 and 24 show the variable shape three-dimensional structure with the four variable shape frames extended in one direction (X direction). Although not shown in the figures, the four variable shape frames may be extended in the Y direction or may be extended in the Z direction. When the four variable shape frames are extended in the X, Y, and Z direction by the same amount, the variable shape three-dimensional structure has a three-dimensional shape with an increased volume.

Although not shown in the figures, in another embodiment, a variable shape three-dimensional structure may be formed by using four of the variable shape frames shown in FIGS. 18 to 20. In this case, the four variable shape frames are coupled by using substantially the same structure as in the embodiment of FIGS. 21 to 24.

Although some embodiments of the present invention are described above with reference to the drawings, the present invention is not limited to the illustrated embodiments. Various modifications or variations can be made to the illustrated embodiments without departing from the spirit and scope of the present invention.

The variable shape frame and the variable shape three-dimensional structure according to the present invention can be used in many applications such as architectural structures, containers, exhibits, pavilions, play equipment, assembling toys, decorations, art objects, furniture, beds of vehicles, lighting devices, enclosures for animals such as pets, steps, robot bodies, fish tanks, pools, bathroom stalls, dressing compartments, shower stalls, above-ground buildings, underground buildings, underwater buildings, aerial buildings, simple apartments (e.g., for stricken areas), warehouses, kitchens, vegetable factories, tents, zoos, and botanical gardens.

The invention claimed is:

1. A variable shape frame which has a polygonal shape and whose shape can be changed, comprising:
    extendable arms forming each side of the polygonal frame; and
    corner members located at at least two of all corners of the polygon, wherein
    each of the extendable arms includes
    a plurality of cross units each formed by two rigid members crossing each other in an X-shape and pivotally coupled by a middle coupling shaft, and
    an end coupling portion pivotally coupling ends of adjacent ones of the cross units,
    the end coupling portion includes inner end coupling shafts located on an inner side of the polygonal frame and outer end coupling shafts located on an outer side of the polygonal frame,
    adjacent two of the extendable arms are pivotally coupled by a common one of the inner end coupling shafts at every corner of the polygon, and
    the corner member located between the first extendable arm and the second extendable arm which are adjacent to each other includes a first guide portion and a second guide portion, the first guide portion linearly guiding two or more of the inner end coupling shafts, two or more of the middle coupling shafts, or two or more of the outer end coupling shafts of the first extendable arm in a longitudinal direction of the side formed by the first extendable arm, and the second guide portion linearly guiding two or more of the inner end coupling shafts, two or more of the middle coupling shafts, or two or more of the outer end coupling shafts of the second extendable arm in a longitudinal direction of the side formed by the second extendable arm.

2. The variable shape frame according to claim 1, wherein the corner member includes the common inner end coupling shaft that pivotally couples the first extendable arm and the second extendable arm, the first guide portion, and the second guide portion.

3. The variable shape frame according to claim 1, wherein the first guide portion linearly guides the two or more of the inner end coupling shafts of the first extendable arm in the longitudinal direction of the side formed by the first extendable arm, and the second guide portion linearly guides the two or more of the inner end coupling shafts of the second extendable arm in the longitudinal direction of the side formed by the second extendable arm.

4. The variable shape frame according to claim 1, wherein the corner member includes a first straight member extending in the longitudinal direction of the side formed by the first extendable arm and a second straight member extending in the longitudinal direction of the side formed by the second extendable arm,
the first guide portion is a slit extending from a distal end toward a proximal end of the first straight member, and
the second guide portion is a slit extending from a distal end toward a proximal end of the second straight member.

5. The variable shape frame according to claim 1, wherein the polygon is a quadrilateral, and
the corner members are located at two opposite ones of the corners.

6. The variable shape frame according to claim 1, wherein the corner members are located at every corner of the polygon.

7. A variable shape frame which has a polygonal shape and whose area can be changed, comprising:
extendable arms forming each side of the polygonal frame; and
a variable length coupling member whose length can be changed and which couples two of the extendable arms which form at least two opposite ones of the sides of the polygonal frame, wherein
each of the extendable arms includes
a plurality of cross units each formed by two rigid members crossing each other in an X-shape and pivotally coupled by a middle coupling shaft, and
an end coupling portion pivotally coupling ends of adjacent ones of the cross units,
the end coupling portion includes inner end coupling shafts located on an inner side of the polygonal frame and outer end coupling shafts located on an outer side of the polygonal frame,
adjacent two of the extendable arms are pivotally coupled by a common one of the inner end coupling shafts at every corner of the polygon,
the variable length coupling member that couples the first extendable arm and the second extendable arm which are located opposite to each other has its one end coupled to the outer end coupling shaft, the middle coupling shaft, or the inner end coupling shaft of the first extendable arm and has the other end coupled to the outer end coupling shaft, the middle coupling shaft, or the inner end coupling shaft of the second extendable arm, the variable length coupling member includes a first adjustment member and a second adjustment member which can slide relative to each other,
the first adjustment member is a tube member,
the second adjustment member is a core member slidably fitted in the tube member,
the first adjustment member is coupled to the outer end coupling shaft of the first extendable arm,
the second adjustment member is coupled to the outer end coupling shaft of the second extendable arm,
the first adjustment member has a first guide slit that slidably receives the inner end coupling shaft of the first extendable arm, and
the second adjustment member has a second guide slit that slidably receives the inner end coupling shaft of the second extendable arm.

8. A variable shape three-dimensional structure, comprising:
a longitudinal coupling member that holds two of the variable shape frames according to claim 1 such that the two variable shape frames are separated from each other in a vertical direction and parallel to each other.

9. The variable shape three-dimensional structure according to claim 8, wherein
the longitudinal coupling member is formed by the common inner end coupling shaft extending in the vertical direction so as to couple the upper and lower variable shape frames.

10. The variable shape three-dimensional structure according to claim 8, wherein
the longitudinal coupling member has such a structure that a longitudinal height of the longitudinal coupling member can be adjusted.

11. The variable shape three-dimensional structure according to claim 8, wherein
the longitudinal coupling member includes first and second variable shape frames having the same structure as the upper and lower variable shape frames and located opposite to each other,
the outer end coupling shafts of each of upper and lower ones of the extendable arms of the first variable shape frame forming the longitudinal coupling member are pivotally coupled to the outer end coupling shafts of one of the extendable arms of the upper or lower variable shape frame, and
the outer end coupling shafts of each of upper and lower ones of the extendable arms of the second variable shape frame forming the longitudinal coupling member are pivotally coupled to the outer end coupling shafts of another one of the extendable arms of the upper or lower variable shape frame.

12. The variable shape three-dimensional structure according to claim 11, wherein
the first and second variable shape frames and the upper and lower variable shape frames form four sides of a quadrangular prism.

* * * * *